(No Model.) 2 Sheets—Sheet 2.
M. LINDNER.
LUBRICATOR.
No. 338,087. Patented Mar. 16, 1886.
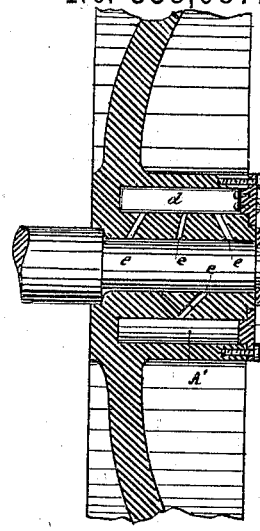
Fig. IX.
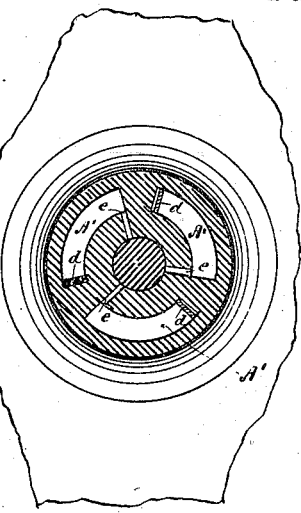
Fig. X.
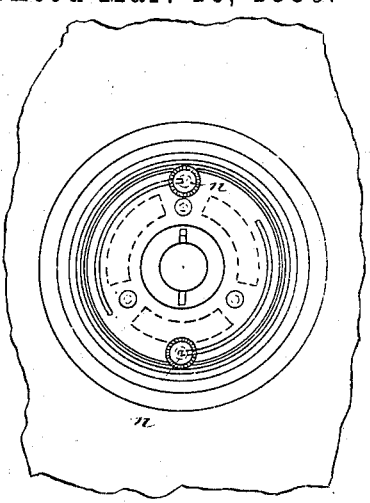
Fig. XI.
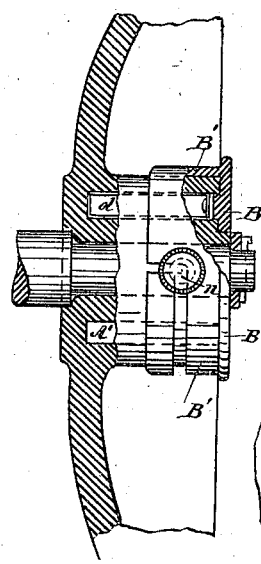
Fig. XII.
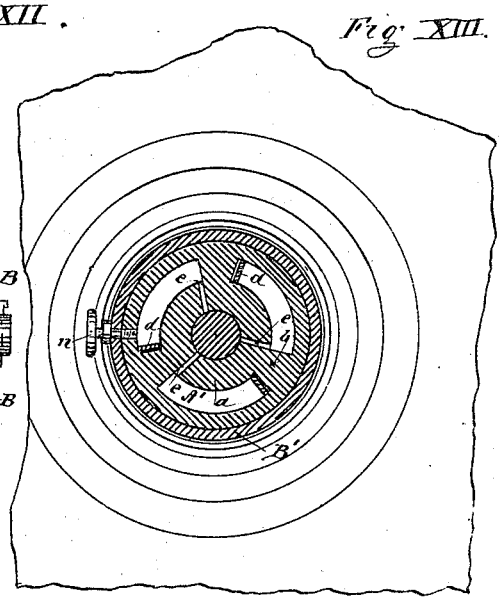
Fig. XIII.
Witnesses.
Thomas Turner
Wm. A. Lowe
Inventor.
Moritz Lindner
per Roeder & Briesen
Attorneys.

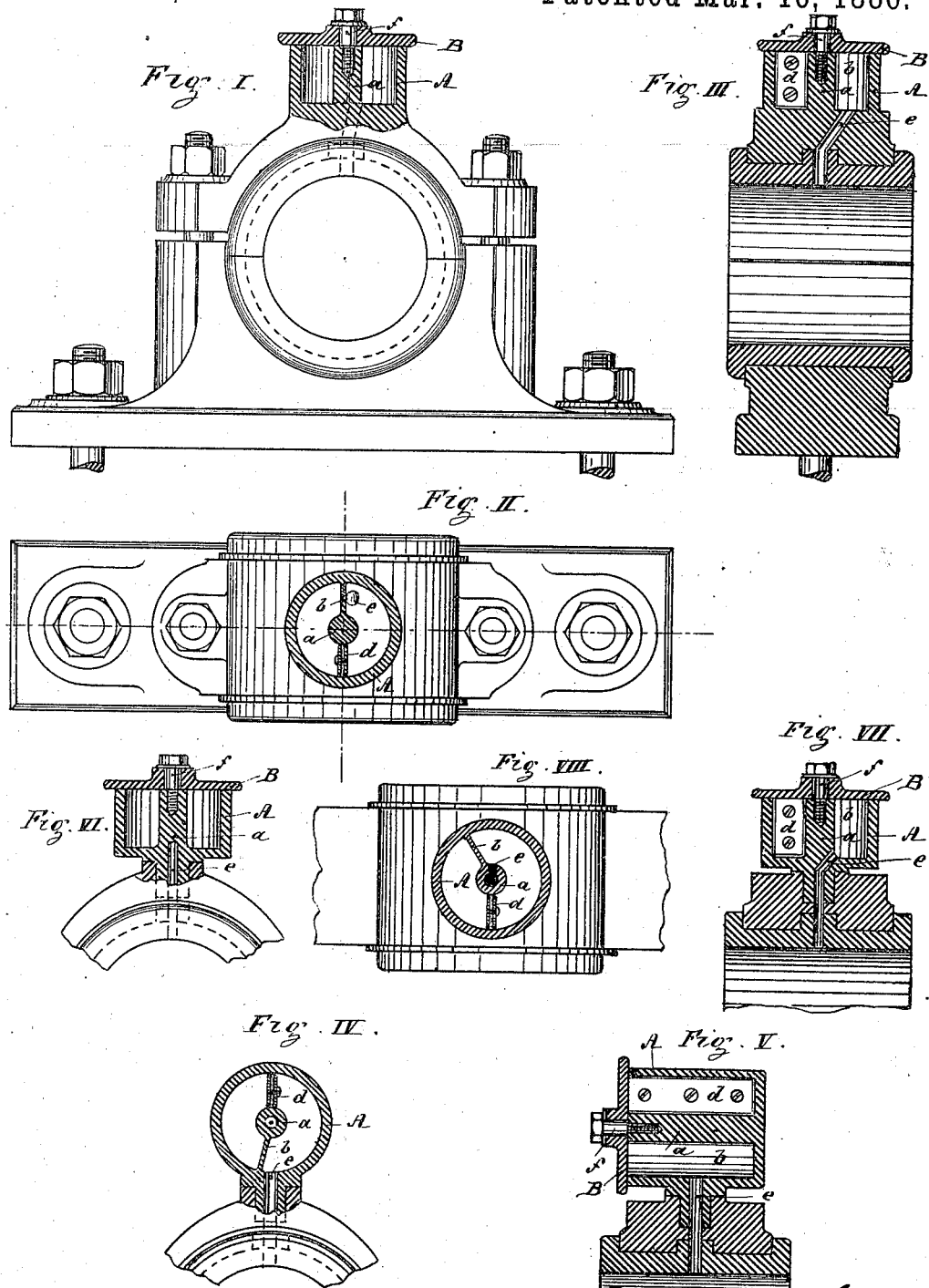

UNITED STATES PATENT OFFICE.

MORITZ LINDNER, OF MEUSELWITZ, SAXONY, GERMANY.

LUBRICATOR.

SPECIFICATION forming part of Letters Patent No. 338,087, dated March 16, 1886.

Application filed August 6, 1885. Serial No. 173,703. (No model.)

*To all whom it may concern:*

Be it known that I, MORITZ LINDNER, a citizen of Germany, residing at Meuselwitz, in the Empire of Germany, have invented a new and useful Improvement in Lubricators, of which the following is a specification.

This invention relates to lubricators for thick lubricants; and it consists in the elements of improvement hereinafter more fully pointed out.

In the accompanying drawings, Figure I represents a bearing with a lubricator embodying my invention, partly in section. Fig. II is a top view of the same. Fig. III is a cross-section of a bearing, showing a lubricator made in a separate piece. Fig. IV is a vertical section, and Fig. V is a cross-section, of a lubricator arranged parallel to the turning shaft, showing the lubricator removable. Fig. VI is a vertical section of a lubricator fastened to the cap. Fig. VII is a cross-section, and Fig. VIII a plan, of the same. Fig. IX is a vertical section of the lubricating device arranged for the hub of a wheel. Fig. X is a cross-section, and Fig. XI an end view, of the same. Fig. XII is a sectional side view of a modification, showing the cover surrounded by a ring. Fig. XIII is a top view, partly in section, of the same.

A is the lubricating-chamber, either cast on the cap of the bearing or screwed upon the same. This chamber is provided with a central hub, $a$, connected by partition $b$ with one side of the chamber A.

$e$ is the hole or passage, through which the lubricant passes or is forced upon the journal, arranged close to the partition $b$.

B is the cover of the lubricator, turning on the bolt $f$, attached to the central hub, $a$. To this cover B a downward-projecting wing, $d$, is attached, fitting tight into the annular ring or space formed between the wall of the lubricator and the central hub, $a$.

When the lubricator is first filled with a thick lubricant, the cover B is placed upon the chamber A, so that the wing $d$ comes close to the partition $b$ at the side opposite where the hole or passage $e$ is made. By turning the cover B this wing $d$ will act as a piston in the annular space and force the thick lubricant gradually into the hole or passage $e$.

In Figs. IX, X, and XI the hub of the wheel is made with three or more annular cavities, A', from each of which holes or passages $e$ communicate with the axle or shaft.

The cover B is provided with a corresponding number of wings, $d$, fitting tight into these annular recesses, and which force, when the cover is turned, the thick lubricant into these holes $e$. Bolts $n$, passing through circular slots in the cover, fix this cover in any position.

In Figs. XII and XIII the cover B is provided with an external ring, B', surrounding the hub of the wheel, and in which the bolt $n$ is arranged for fixing the cover in any position.

The wing $d$ is made tight against the sides and bottom of the annular ring or chamber of the lubricator by suitable india-rubber or leather packing.

I am aware of Patent No. 95,370, granted to W. T. Moody, September 28, 1869, and of Patent No. 287,963, granted to H. Reisert, November 6, 1883, and I do not claim the constructions therein described; but I do claim—

The combination of chamber A, having hub $a$, aperture $e$, and partition $b$, extending from hub to the wall of the chamber, with cover B, adapted to turn on chamber A and provided with wing $d$, substantially as specified.

In testimony whereof I have signed my name to this specification in the presence of two subscribing witnesses.

MORITZ LINDNER.

Witnesses:
 EDMUND BACH,
 OTTO GUNTHER.